United States Patent Office 3,493,371

Patented Feb. 3, 1970

3,493,371

RADIATION-SENSITIVE RECORDING MATERIAL

Albert Lucien Poot, Kontich, Belgium, assignor to Gevaert-Agfa N.V., Mortsel, Belgium, a company of Belgium No Drawing. Filed Jan. 24, 1968, Ser. No. 700,018
Claims priority, application Great Britain, Mar. 31, 1967, 14,945/67
Int. Cl. G03c *1/68, 7/08, 1/52*
U.S. Cl. 96—33 9 Claims

ABSTRACT OF THE DISCLOSURE

Recording material having a light-sensitive layer containing a heat- and light-decomposable diazo compound having one of the following structures:

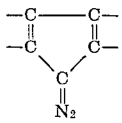

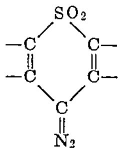

preferably combined with an alkali-soluble polymer, yielding on image-wise exposure to light or heat, and aqueous alkaline development, a resist image suitable for offset printing.

The present invention relates to radiation-sensitive recording materials and to the use of such materials in the preparation of a resist.

The term "resist" has a variety of meanings but generally it refers to protective coatings that prevent the action of physical, chemical or electrical effects on an underlying material.

Basically the production of a photo-resist contains the steps of coating a surface with a photo-sensitive composition and image-wise or record-wise exposing the coating to light to which it is sensitive, thereby effecting an increase or decrease in solubility in a processing liquid of the exposed portions of the coating and treating the coating with a suitable processing liquid, in order to selectively remove the exposed or unexposed portions of the coating.

The resist image can be grease-accepting to provide a planographic printing master. It can act as a resist against the action of chemical attack, e.g. with acid or alkali or other chemicals, which etch or dissolve a layer or adjacent support.

The resist image can provide a mask for electrolytic vacuum-coating or spray-coating of metals, the deposition of dyes, or attack by sand-blasting. Further, the resist image, when formed on a porous support, can provide a screen-printing stencil. As supports for stencils porous materials such as Japanese fiber paper, or tissues made of glass fiber, or natural or synthetic textile fibers, or metal thread may be used.

It has now been found that a recording material comprising a support and a recording layer containing a diazo-compound of the following general formula:

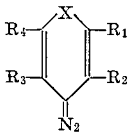

wherein X represents a chemical bond or a sulfonyl group, and each of $R_1$, $R_2$, $R_3$ and $R_4$ represents hydrogen, but preferably an electron-attracting substituent, e.g. a halogen atom (fluorine, chlorine bromine and iodine), a cyano group, a nitro group, an aryl group including a substituted aryl group, or $R_1$ together with $R_2$ represents the atoms necessary to close an adjacent aromatic nucleus, and/or $R_3$ together with $R_4$ represents the atoms necessary to close an adjacent aromatic nucleus, X only being a sulfonyl group when $R_1$ together with $R_2$, and $R_3$ together with $R_4$, form an adjacent aromatic nucleus, is particularly suited for the preparation of a photo-resist.

Preferred diazo-compounds for use according to the present invention with information about their preparation are listed in the following table.

TABLE

| | | |
|---|---|---|
| 1 | 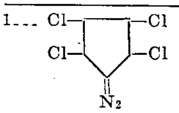 | Chem. Ber. 97 (1964) 735. |
| 2 | 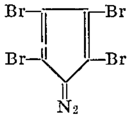 | J.A.C.S. 85 1273–7 (1963). |
| 3 | 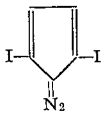 | J.A.C.S. 85 1273–7 (1963). |
| 4 | 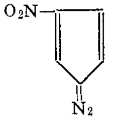 | J.A.C.S. 85 1273–7 (1963). |
| 5 | 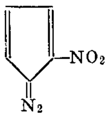 | J.A.C.S. 85 1273–7 (1963). |
| 6 | 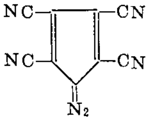 | J.A.C.S. 87 1820–21 (1966). |
| 7 | 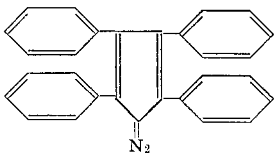 | Chem. Ber. 97 (1964) 735. |
| 8 | 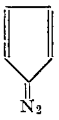 | J.A.C.S. 75 (1953) 5956–7. |
| 9 | 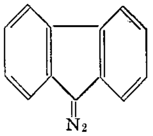 | Ber. 44 2207. |
| 10 | 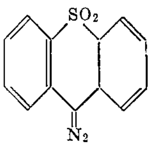 | Chem. Ber. 97 (1964) 740. |

The term "photolysable" when used in the specification means that the compounds can be decomposed under the action of light in the wavelength range of 250 to 350 m. without use of spectrally sensitizing agents. Upon exposure to active electromagnetic radiation, the photolysable compounds split off reactive radicals. Thus, e.g., Mc. Bee et al., J. Org. Chem. 31 (1966), 768–772 have proved experimentally that in the photolysis of the compound corresponding to Formula I the following reaction takes place:

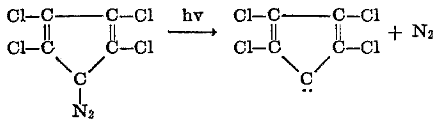

so that in principle, due to the evolution of nitrogen, these compounds can also be used in the formation of vesicular images.

The carbene radical formed in the photolysis due to the presence of electron-attracting groups is a very reactive electron-deficient species, which may involve reaction with nucleophilic groups, e.g., ethylenic compounds.

A recording material according to the present invention may be used in different recording techniques based on active image-wise electromagnetic irradiation as well as on image-wise heating, since also by heating the abovementioned diazo-compounds reactive radicals can be formed.

The recording layer may be completely composed of the above described diazo-compounds but in general these are used in combination with a binding agent, which is preferably a polymer soluble in an aqueous alkaline solution.

The polymer is preferably incorporated into the light-sensitive composition when it is intended to prepare a photoresist for printing purposes.

As alkali-soluble polymers may be used copolymers of unsaturated carboxylic acid, e.g., acrylic acid, methacrylic acid, crotonic acid, maleic acid, fumaric acid, itaconic acid and citraconic acid. If the copolymer comprises an unsaturated dicarboxylic acid, the half-esters and half-amides thereof may be used too. These unsaturated carboxylic acids are preferably copolymerized with ethylenically unsaturated compounds, which are substantially insoluble in an alkaline medium and which are present in the copolymer in such a proportion that the copolymer itself remains soluble in an alkaline medium. Ethylenically unsaturated compounds which may be so used include, e.g., styrene and its derivatives, vinyl chloride, vinylidene chloride, vinyl esters such as vinyl acetate, acrylic acid esters, methacrylic acid esters, acrylonitrile, and methacrylonitrile.

As alkali-soluble resins natural resins such as shellac or colophony can be used too.

Preferred alkali-soluble polymers, however, are polymers containing aromatic hydroxy groups which groups are present in the so-called "novolaks." According to British Standard 1755–1951 these are "soluble, fusible, synthetic resins produced from a phenol and an aldehyde, having no methylol groups in the molecule and therefore incapable of condensing with other novolak molecules on heating without the addition of hardening agents."

Information about the preparation and structure of "novolaks" can be found in C. Ellis "The Chemistry of Synthetic Resins," volume 1 (1935), Reinhold Publishing Corporation, New York, pages 303–309.

The kind of image formed, either negative or positive, strongly depends on the type of the substituents(s) on the cyclopentadiene nucleus and the binder used in combination with the photolysable compound.

The amount of alkali-soluble resin added to the light-sensitive coating may vary within wide limits. Preferably, however, in the preparation of planographic printing plates 3 parts by weight of alkali-soluble resin are used for 1 part by weight of diazo-compound. If plates are required which can withstand the acid etching agents used in etching machines, e.g. for the preparation of relief printing masters or gravure masters, higher resin concentrations are used, e.g. 4 parts by weight of the resin for 1.0 part of the above diazo-compounds.

The above described diazo-compounds may be used in admixture with each other or with other light-sensitive or heat-sensitive substances and substances which increase the sensitivity to light and/or to heat, e.g. spectrally sensitizing agents, dyes and pigments.

Further, the light-sensitive coating may also comprise stabilizers, plasticizers, extenders, dyes and the like. The term "light-sensitive composition" in the accompanying description is to be understood to cover a composition comprising the above described cyclopentadiene diazo-compounds occasionally including the alkali-soluble polymers and other additives.

In order to prepare a copying material in accordance with the invention a support is coated with a solution in an organic solvent or in a mixture of organic solvents of the cyclopentadiene diazo-compound, and which solvent(s) may include the alkali-soluble polymer.

Usable organic solvents are, e.g., ethylene glycol monomethylether, ethylene glycol monoethylether, dioxane, tetrahydrofuran, dimethylformamide or a water-miscible ketone, e.g., acetone.

The recording layer composition can be applied according to a coating technique known per se to a suitable support, which can be a metal, glass, paper or resin plate or sheet, e.g., a metal plate or foil made up of aluminium, zinc, copper, or of several metal layers with different wetting properties.

It is not strictly necessary to subject the metal supports to be used to any preliminary chemical treatment in order to render their surfaces suitable for accepting the light-sensitive layer. A simple mechanical roughening of the metallic surface proves to be quite sufficient for the application of the light-sensitive layer, which firmly attaches itself to the metallic base in the form of a thin uniform film. For the production of planographic printing plates there can also be used, e.g., plates of stone or glass and also especially treated sheets of paper or plastic foils.

The base or support can be coated by whirl-coating, brushing or spraying with a solution of the light-sensitive composition in a suitable solvent or may be coated continuously on known coating machines, whereupon the solvent or solvent mixture is eliminated by known means such as evaporation, thus having a more or less thin coating of the light-sensitive composition upon the base or support. The thickness of the light-sensitive layer obtained may be from about 1 to 100$\mu$. The light-sensitive coating is then ready for exposure to actinic light rays. The light source should preferably furnish an effective amount of ultraviolet radiation. Suitable sources of light include carbon arcs, xenon lamps, mercury vapour lamps, fluorescent lamps, argon glow lamps, photographic flood lamps and tungsten lamps.

According to a preferred exposure technique for preparing a planographic printing master the light-sensitive layer is exposed to actinic light through a contacted transparent master pattern consisting solely of opaque and transparent areas, e.g., the so-called line or half-tone positive or negative wherein the opaque areas are of the same optical density.

It is also possible to produce a resist image by image-wise heating, which preferably occurs by image-wise irradiating the recording layer with electromagnetic radiation of longer wavelengths, e.g., visible and infra-red light, which is converted into heat in substances present in the recording material in heat-conductive relationship with the said diazo-compound or mixtures thereof. For such a recording technique is made, e.g., to the cognate United Kingdom patent applications 20,818/65 and 21,985/65, corresponding with the published Dutch patent application 66/06719.

The exposed recording layer can be developed by means of an alkaline aqueous solution whereby depending on the type of the diazo-compound and binder a positive or negative resist will be obtained, i.e. a recording layer wherein the unexposed portions or exposed portions respectively are left. The development of the exposed recording layers can be advantageously carried out with an aqueous solution of an inorganic base or an alkaline salt, e.g., trisodium phosphate or disodium phosphate.

The resist images can be used for planographic screen and offset printing. The support may also be subjected to an etching process whereby a plate suitable for intaglio or relief printing can be prepared.

After removal of the soluble portions of the light-sensitive layer by the developing solution, the ink-repellency of the unshielded areas of the base material can be improved by an after-treatment with a lithographic preparation for hydrophilizing or enhancing the hydrophility of said areas. Compounds and compositions suited for that purpose are described, e.g., in United Kingdom patent specification 946,538.

The ink-receptivity of the hydrophobic non-exposed areas can be improved by treating the developing printing plate with a lacquer, which adheres to the hydrophobic areas and forms an oleophilic deposit thereon. Suitable lacquers and the method of applying them are described in United Kingdom patent specification 968,706 and Belgian patent specification 631,790.

In order to prepare a printing form for gravure printing an exposure and etching technique is used whereby in the base material according to a screen pattern cells are formed for receiving the printing ink.

Base materials suited for etching are well known. More particularly are mentioned base materials, which substantially consist of zinc, copper, steel or an etchable magnesium alloy.

A special advantage of the diazo-compounds according to the invention is that they can be used as well for positive as for negative printing.

The shelf life of the recording materials according to the present invention is good, for they are not so thermosensitive that they will gradually decompose at ambient storage temperature.

The following examples illustrate the present invention.

EXAMPLE 1

A recording material was produced as follows:

80 g. of the diazo-compound corresponding to the structural Formula 1 and 250 g. of a novolak prepared by allowing to react p-cresol with formaldehyde were each separately dissolved in 1000 ccs. of acetone. Both solutions were mixed and the mixture coated onto a roughened aluminum foil. The coating and drying proceeded in such a way that a layer of 0.075 mm. was obtained.

The dried layer was exposed through a line transparency for 10 min. at a distance of 15 cm. with a high-pressure mercury vapour bulb of 80 watt. Thereupon the exposed layer was developed by rubbing it with a brush moistened with a 1% solution of disodium phosphate. The developed plate was inked with a fatty offset ink. A positive planographic printing master was obtained.

EXAMPLE 2

A recording material was produced as follows:

100 g. of the diazo-compound corresponding to the structural Formula 7 and 50 g. of the "novolak" used in Example 1 were dissolved in a mixture of 1000 ccs. of tetrahydrofuran and 4000 ccs. of acetone. The solution was applied to a roughened aluminum foil. The coating and drying proceeded in such a way that a layer of 0.075 mm. was obtained.

The dried layer was exposed through a line transparency for 10 min. at a distance of 15 cm. with a high-pressure mercury vapour bulb of 80 watt. Thereupon the exposed layer was developed by rubbing it subsequently with a cotton pad soaked in a 0.2 N aqueous sodium hydroxide solution and a cotton pad soaked with a 1% aqueous solution of disodium phosphate.

The developed plate was inked with a fatty offset ink. A negative planographic printing plate ready for printing was obtained.

EXAMPLE 3

Example 2 was repeated with the proviso however, that the p-cresol-formaldehyde novolak was replaced by a same amount of a phenol-formaldehyde novolak. On development with the solutions described in Example 2 a positive planographic printing plate was obtained.

We claim:

1. A recording material comprising a supported layer containing a photolysable diazo-compound of the following general formula:

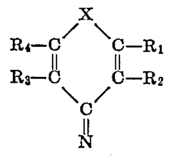

wherein X is selected from the group consisting of a chemical bond and a sulfonyl group, and $R_1$, $R_2$, $R_3$ and $R_4$ are selected from the group consisting of H, electron-attracting substituent halogen, CN, $NO_2$, aryl groups and atoms represented jointly by $R_1$ and $R_2$ and by $R_3$ and $R_4$ necessary to complete a benzene ring, X being sulfonyl only when $R_1$ together with $R_2$ and $R_3$ together with $R_4$ form benzene rings.

2. A recording material as defined in claim 1 wherein said diazo-compound has the formula

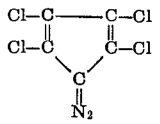

3. A recording material as defined in claim 1 wherein said dizo-compound has the formula

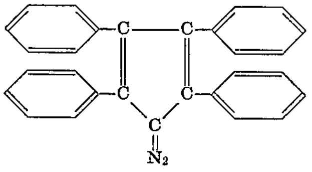

4. A recording material as defined in claim 1 wherein said layer contains an alkali-soluble binder.

5. A recording material as defined in claim 4 wherein said binder is a "novolak."

6. A recording material as defined in claim 1 wherein the support for said layer has a surface suitable for preparation of a planographic printing master.

7. A recording material as defined in claim 6 wherein said support is of aluminum.

8. A process for making a printing plate which comprises exposing recording material as defined in claim 1 imagewise in according with a line original to electromagnetic radiation from the group consisting of ultraviolet, visible and infra-red, and developing said material with a solvent for either the unexposed or exposed areas of the said layer.

9. A process as defined in claim 8 wherein said recording material includes in its light-sensitive layer, an alkali-soluble resin, and said material is developed after exposure by treatment with an alkaline liquid.

(References on following page)

References Cited

UNITED STATES PATENTS

| | | | |
|---|---|---|---|
| 1,837,679 | 12/1931 | Schmidt et al. | 96—49 |
| 1,926,322 | 9/1933 | Vander Grinten et al. | 96—49 |
| 2,063,631 | 12/1936 | Schmidt et al. | 96—91 XR |
| 3,062,644 | 11/1962 | Neugebavev et al. | 96—49 XR |
| 2,971,842 | 2/1961 | Moore et al. | 96—33 |
| 2,997,467 | 8/1961 | Cox et al. | 96—33 XR |
| 3,401,038 | 9/1968 | Tanasik et al. | 96—91 |

FOREIGN PATENTS

| | | |
|---|---|---|
| 64,321 | 9/1949 | Netherlands. |

NORMAN G. TORCHIN, Primary Examiner

C. BOWERS, Assistant Examiner

U.S. Cl. X.R.

96—35.1, 36.3, 3.75, 91, 115